(12) United States Patent
Zhang et al.

(10) Patent No.: US 10,855,533 B2
(45) Date of Patent: Dec. 1, 2020

(54) SYSTEM, A CLOUD PLATFORM, A DEVICE AND A METHOD FOR CONFIGURING EDGE DEVICES

(71) Applicant: Siemens Aktiengesellschaft, Munich (DE)

(72) Inventors: Hai Tao Zhang, Beijing (CN); Yong Yuan, Beijing (CN); Qi Wang, Wuhan (CN); Wen Jing Zhou, Wuxi (CN); He Yu, Wuxi (CN); Teng Fei Wu, Wuxi (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/407,336

(22) Filed: May 9, 2019

(65) Prior Publication Data
US 2019/0349253 A1  Nov. 14, 2019

(30) Foreign Application Priority Data

May 11, 2018  (CN) .......................... 2018 1 0450904

(51) Int. Cl.
*H04L 12/24* (2006.01)
*H04L 12/26* (2006.01)
*H04L 29/08* (2006.01)

(52) U.S. Cl.
CPC ...... *H04L 41/0806* (2013.01); *H04L 41/0853* (2013.01); *H04L 43/18* (2013.01); *H04L 67/125* (2013.01)

(58) Field of Classification Search
CPC ............... G05B 19/058; G05B 19/418; G05B 19/4185; G06F 9/5072; H04L 41/0226;

(Continued)

(56) References Cited

U.S. PATENT DOCUMENTS 10,027,699 B2 * 7/2018 Wei ...................... G05B 19/058
10,049,096 B2 * 8/2018 Deepak ................. G06F 40/186

(Continued)

FOREIGN PATENT DOCUMENTS

CN  105847236 A  8/2016

OTHER PUBLICATIONS

Eastburn, Josh, "An overview of industrial IoT, from edge to cloud," Plant Engineering. Apr. 2020, vol. 74 Issue 3, p. 16-18. 3p. (Year: 2020).*

(Continued)

*Primary Examiner* — Alina A Boutah
(74) *Attorney, Agent, or Firm* — Harness, Dickey & Pierce, P.L.C.

(57) ABSTRACT

A system, a cloud platform, a device and a method are for configuring edge devices. The system includes one or more edge devices generating corresponding one or more field data; a controller connected to one or more edge devices to acquire one or more field data; and a cloud platform connected to the controller to configure one or more edge devices. The cloud platform includes a cloud platform receiving module receiving one or more field data from the controller; an asset database including one or more templates corresponding to the configuration data of one or more edge devices; and a configuration module configuring one or more edge devices according to one or more field data and the corresponding templates. A specific protocol is used, in at least one embodiment, to packetize the field data generated by edge devices and utilizes the corresponding templates and field data to configure edge devices.

19 Claims, 9 Drawing Sheets

(58) Field of Classification Search
CPC .............. H04L 41/0806; H04L 41/0843; H04L 41/0853; H04L 41/0886; H04L 43/18; H04L 67/12; H04L 67/125
See application file for complete search history.

(56) References Cited

U.S. PATENT DOCUMENTS

| | | |
|---|---|---|
| 2015/0066162 A1 | 3/2015 | Hokeness et al. |
| 2015/0326432 A1* | 11/2015 | Fujie .................. H04L 67/1097 709/222 |
| 2016/0274553 A1* | 9/2016 | Strohmenger ... G05B 19/41885 |
| 2017/0060574 A1* | 3/2017 | Malladi ................... G06F 9/542 |
| 2017/0192414 A1 | 7/2017 | Mukkamala |
| 2017/0285623 A1* | 10/2017 | Figoli ..................... H04L 67/12 |
| 2018/0300124 A1* | 10/2018 | Malladi .................. G05B 15/02 |
| 2018/0356792 A1* | 12/2018 | Chao .................. G05B 19/4185 |
| 2019/0064787 A1* | 2/2019 | Maturana ........... G05B 23/0227 |

OTHER PUBLICATIONS

Definition: "controller" from FOLDOC.com (Year: 2020).*
Extended European Search Report dated Sep. 2, 2019.
Shaopeng, L. et al., "Plug-and-play sensor platform for legacy industrial machine monitoring," 2016 International Symposium on Flexible Automation, IEEE, pp. 432-435, Aug. 1, 2016.
Marian, F., "MindSphere," https://indico.cern.ch/event/654636/contributions/2834241/attachments/1718639/2773565/Filka_03_MindSphere_Overview Automative.pdf, pp. 1-19, Feb. 1, 2017.

* cited by examiner

SYSTEM, A CLOUD PLATFORM, A DEVICE AND A METHOD FOR CONFIGURING EDGE DEVICES

PRIORITY STATEMENT

The present application hereby claims priority under 35 U.S.C. § 119 to Chinese patent application number CN 201810450904.2 filed May 11, 2018, the entire contents of which are hereby incorporated herein by reference.

FIELD

Embodiments of the invention generally relate to the field of the configurations of edge devices. In particular, embodiments of the present invention relate to a system, a cloud platform, a device and a method for configuring edge devices and a method for generating configuration data of the edge device.

BACKGROUND ART

With the proposal of Industry 4.0, a large number of applications of remote monitoring, remote maintenance and predictive maintenance have come into being. The applications, for example, include acquisition of submitted data from a data center, acquisition of remote data, various processing and data analysis.

The programmable logic controller (PLC) is a field control device, which acquires and generates a lot of field data. The PLC is connected to various edge devices to communicate with edge devices and control edge devices. For example, an edge device can be an electric motor connected to the PLC. Corresponding parameters of the electric motor are set in the PLC and these parameters are stored in the PLC. Therefore, the parameters of edge devices such as an electric motor and their actual storage addresses can be acquired from the PLC. In a remote data center, these edge devices are called assets, and they need to be configured before being used.

SUMMARY

To configure such edge devices, it is necessary to set the attributes, parameters, types and actual addresses of the assets. However, the inventors have discovered that these configurations need to be manually entered by a professional operator or cloud developer on a cloud platform. The inventors have discovered that the input operation of a large number of configuration data is time-consuming and error-prone.

The embodiments of the present invention provide a system, a cloud platform, a device and a method for configuring edge devices to solve at least the problem of being difficult to configure edge devices found in the prior art.

According to one aspect of the embodiments of the present invention, a system for configuring edge devices is provided and the system comprises one or more edge devices generating corresponding one or more field data, a controller connected to one or more edge devices to acquire one or more field data, and a cloud platform connected to the controller to configure one or more edge devices, wherein the cloud platform comprises a cloud platform receiving module receiving one or more field data from the controller, an asset database comprising one or more templates corresponding to the configuration data of one or more edge devices, and a configuration module configuring one or more edge devices according to one or more field data and the corresponding templates.

According to another aspect of the embodiments of the present invention, a cloud platform for configuring edge devices is provided and the cloud platform comprises a cloud platform receiving module receiving one or more field data generated by the corresponding one or more edge devices, an asset database comprising one or more templates corresponding to the configuration data of one or more edge devices, and a configuration module configuring one or more edge devices according to one or more field data and the corresponding templates.

According to a further aspect of the embodiments of the present invention, a device for configuring edge devices is provided and the device comprises a controller connected to one or more edge devices to acquire one or more field data generated by the corresponding one or more edge devices; the controller comprises a receiver acquiring one or more field data from one or more edge devices, a data packetization module packetizing the acquired one or more field data into a data packet according to a preset protocol, and a transmitter transmitting the data packet to the cloud platform receiving module of the cloud platform; the data packet is used by the cloud platform to generate configuration data of one or more edge devices according to the corresponding one or more templates of the configuration data of one or more edge devices.

According to a fourth aspect of the embodiments of the present invention, a method for configuring edge devices is provided and the method comprises receiving one or more field data, wherein one or more field data is generated by the corresponding one or more edge devices, and configuring one or more edge devices according to one or more field data and the corresponding one or more templates, wherein one or more templates are included in the asset database.

According to a fifth aspect of the embodiments of the present invention, a method for generating configuration data of edge devices is provided and the method comprises acquiring one or more field data from one or more edge devices, wherein one or more field data is generated by the corresponding one or more edge devices, packetizing the acquired one or more field data into a data packet according to a preset protocol, and transmitting the data packet to the cloud platform, wherein the data packet is used by the cloud platform to generate configuration data of one or more edge devices according to the corresponding one or more templates of the configuration data of one or more edge devices.

BRIEF DESCRIPTION OF THE DRAWINGS

The drawings described here are used to provide a better understanding of the present invention and constitute a part of the present invention. The example embodiments and the descriptions of the present invention are used to explain the present invention, but do not constitute an improper limitation of the present invention. In the drawings.

Figure 1:
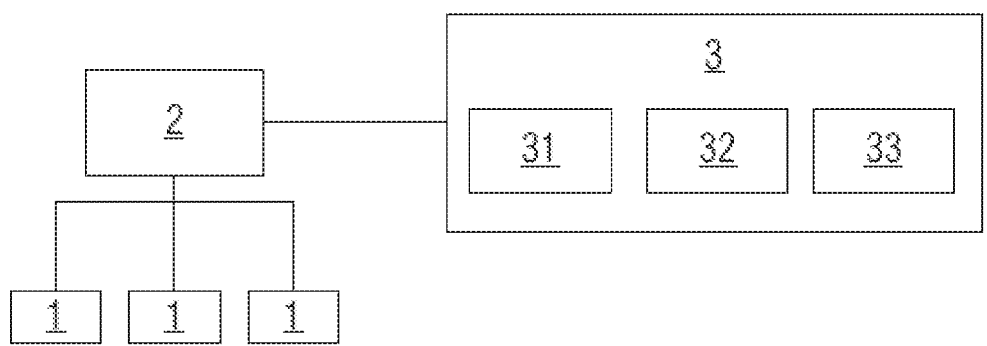
FIG. 1 is a block diagram for the system for configuring edge devices according to the embodiments of the present invention.

Description of reference numerals and symbols in the drawings:
1. Edge device
2. Controller
   21. Receiver
   22. Data packetization module
   23. Transmitter
3. Cloud platform
   31. Cloud platform receiving module
   32. Asset database
   33. Configuration module
   34. Protocol adapter
   35. Protocol library
   36. Data analysis module
S101. Receive one or more field data
S103. Configure one or more edge devices according to one or more field data and the corresponding one or more templates
S105. Analyze at least a part of a data packet to acquire analysis data
S107. Determine the corresponding protocol according to the data packet
S109. Analyze the data packet according to the corresponding protocol to acquire the specific values of field data
S111. Generate configuration data according to the specific values and the templates
S201. Acquire one or more field data from one or more edge devices
S203. Packetize the acquired one or more field data into a data packet according to a preset protocol
S205. Transmit the data packet to the cloud platform.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

To let those skilled in the art better understand the technical solution of the present invention, the following will clearly and completely describe the technical solution in the embodiments of the present invention in combination with the drawings in the embodiments of the present invention. Obviously, the embodiments described are only a part, but not all of the embodiments of the present invention. All other embodiments obtained by those skilled in the art on the basis of the embodiments of the present invention without any creative work should fall within the scope of protection of the present invention.

It should be noted that the terms "first" and "second" in the description, claims and the drawings are used to distinguish between similar objects, but not necessarily used to describe a specific order or sequence. These terms are only used to distinguish one element from another. It should be understood that the data used in such a way can be interchanged as appropriate so that the described embodiments of the present invention can be implemented in an order other than that shown or described here. As used herein, the term "and/or," includes any and all combinations of one or more of the associated listed items. The phrase "at least one of" has the same meaning as "and/or". In addition, the terms "comprise" and "have" and their variants are intended to cover non-exclusive inclusions. For example, the process or method comprising a series of steps or the system, product or equipment comprising a series of modules or units are unnecessarily limited to those clearly-listed steps or modules or units, but can comprise other steps or modules or units which are not clearly listed or are intrinsic to the process, method, product or equipment.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

According to one aspect of the embodiments of the present invention, a system for configuring edge devices is provided and the system comprises one or more edge devices generating corresponding one or more field data, a controller connected to one or more edge devices to acquire one or more field data, and a cloud platform connected to the controller to configure one or more edge devices, wherein the cloud platform comprises a cloud platform receiving module receiving one or more field data from the controller, an asset database comprising one or more templates corresponding to the configuration data of one or more edge devices, and a configuration module configuring one or more edge devices according to one or more field data and the corresponding templates.

In this way, edge devices are automatically configured according to the field data transmitted by the controller and the preset templates on the cloud platform, improving the configuration efficiency and avoiding errors possibly resulting from manual configurations.

According to one example embodiment, the controller, for example, a PLC, comprises a receiver acquiring one or more field data from one or more edge devices, a data packetization module packetizing the acquired one or more field data into a data packet according to a preset protocol, and a transmitter transmitting the data packet to the cloud platform receiving module of the cloud platform.

In this way, data packets of field data are transmitted to the cloud platform based on the preset protocols.

According to one example embodiment, the cloud platform further comprises a protocol adapter acquiring a data packet from the cloud platform receiving module and determining the corresponding protocol according to the data packet.

In this way, the protocol for packetizing field data is determined.

According to one example embodiment, the cloud platform further comprises a protocol library, one or more protocols for packetizing field data are stored in the protocol library, and the protocol adapter analyzes at least a part of the data packet to acquire analysis data and searches the protocol library according to the analysis data to determine the corresponding protocol.

In this way, the protocol is determined according to the match between the protocols stored in the protocol library and the data packet on the cloud platform.

According to one example embodiment, the cloud platform further comprises one or more data analysis modules, each data analysis module corresponds to one edge device of one or more edge devices, it receives the corresponding data packet of the edge device, and analyzes the data packet according to the corresponding protocol to acquire the specific values of field data, and the protocol adapter transmits the data packet to the corresponding data analysis module after determining the corresponding protocol.

In this way, a specific analysis module is used to analyze the specific values of field data of the corresponding edge device.

According to one example embodiment, each template in the asset database is configured according to the information of different edge devices, one or more data analysis modules generate configuration data according to the specific values and the templates in the asset database, and the configuration data is sent to the configuration module to configure one or more edge devices.

In this way, edge devices are configured according to the templates and the specific values of field data.

According to one example embodiment, each template comprises a subfunction module, the subfunction module defines the information for configuring the corresponding edge device, and configuration data is generated based on the information, wherein the information indicates the correspondences between the specific values and the parameters of the edge device.

In this way, the templates for field data are set.

According to another aspect of the embodiments of the present invention, a cloud platform for configuring edge devices is provided and the cloud platform comprises a cloud platform receiving module receiving one or more field data generated by the corresponding one or more edge devices, an asset database comprising one or more templates corresponding to the configuration data of one or more edge devices, and a configuration module configuring one or more edge devices according to one or more field data and the corresponding templates.

In this way, the cloud platform for configuring edge devices according to field data of edge devices and the corresponding templates is set.

According to one example embodiment, one or more field data received by the cloud platform receiving module is a data packet packetized according to a preset protocol, and the cloud platform further comprises a protocol adapter acquiring the data packet from the cloud platform receiving module and determining the corresponding protocol according to the data packet.

In this way, the protocol for packetizing field data is determined.

According to one example embodiment, the cloud platform further comprises a protocol library, one or more protocols for packetizing field data are stored in the protocol library, and the protocol adapter analyzes at least a part of the data packet to acquire analysis data and searches the protocol library according to the analysis data to determine the corresponding protocol.

In this way, the protocol is determined according to the match between the protocols stored in the protocol library and the data packet on the cloud platform.

According to one example embodiment, the cloud platform further comprises one or more data analysis modules, each data analysis module corresponds to one edge device of one or more edge devices, it receives the corresponding data packet of the edge device, and analyzes the data packet according to the corresponding protocol to acquire the specific values of field data, and the protocol adapter transmits the data packet to the corresponding data analysis module after determining the corresponding protocol.

In this way, a specific analysis module is used to analyze the specific values of field data of the corresponding edge device.

According to one example embodiment, each template in the asset database is configured according to the information of different edge devices, one or more data analysis modules generate configuration data according to the specific values and the templates in the asset database, and the configuration data is transmitted to the configuration module to configure one or more edge devices.

In this way, edge devices are configured according to the templates and the specific values of field data.

According to one example embodiment, each template comprises a subfunction module, the subfunction module defines the information for configuring the corresponding edge device, and configuration data is generated based on the information, wherein the information indicates the correspondences between the specific values and the parameters of the edge device.

In this way, the templates for field data are set.

According to a further aspect of the embodiments of the present invention, a device for configuring edge devices is provided and the device comprises a controller connected to one or more edge devices to acquire one or more field data generated by the corresponding one or more edge devices; the controller comprises a receiver acquiring one or more field data from one or more edge devices, a data packetization module packetizing the acquired one or more field data into a data packet according to a preset protocol, and a transmitter transmitting the data packet to the cloud platform receiving module of the cloud platform; the data packet is used by the cloud platform to generate configuration data of one or more edge devices according to the corresponding one or more templates of the configuration data of one or more edge devices.

In this way, edge devices are automatically configured according to the field data and the preset templates, improving the configuration efficiency and avoiding errors possibly resulting from manual configurations.

According to a fourth aspect of the embodiments of the present invention, a method for configuring edge devices is provided and the method comprises receiving one or more field data, wherein one or more field data is generated by the corresponding one or more edge devices, and configuring one or more edge devices according to one or more field data and the corresponding one or more templates, wherein one or more templates are included in the asset database.

In this way, edge devices are automatically configured according to the field data and the preset templates, improving the configuration efficiency and avoiding errors possibly resulting from manual configurations.

According to one example embodiment, the received one or more field data is a data packet packetized according to a preset protocol, and the method further comprises determining the corresponding protocol according to the data packet.

In this way, the protocol for packetizing field data is determined.

According to one example embodiment, the method further comprises analyzing at least a part of the data packet to acquire analysis data and searching the protocol library according to the analysis data to determine the corresponding protocol, wherein one or more protocols for packetizing field data are stored in the protocol library.

In this way, the protocol is determined according to the match between the protocols stored in the protocol library and the data packet.

According to one example embodiment, the method further comprises analyzing the data packet according to the corresponding protocol to acquire the specific values of field data.

In this way, the specific values of the corresponding edge devices are analyzed.

According to one example embodiment, each template is configured according to the information of different edge devices and the method further comprises generating configuration data according to the specific values and the templates.

In this way, edge devices are configured according to the templates and the specific values of field data.

According to one example embodiment, each template comprises a subfunction module, the subfunction module defines the information for configuring the corresponding edge device, and configuration data is generated based on the information, wherein the information indicates the correspondences between the specific values and the parameters of the edge device.

In this way, the templates for field data are set.

According to a fifth aspect of the embodiments of the present invention, a method for generating configuration data of edge devices is provided and the method comprises acquiring one or more field data from one or more edge devices, wherein one or more field data is generated by the corresponding one or more edge devices, packetizing the acquired one or more field data into a data packet according to a preset protocol, and transmitting the data packet to the cloud platform, wherein the data packet is used by the cloud platform to generate configuration data of one or more edge devices according to the corresponding one or more templates of the configuration data of one or more edge devices.

In this way, a method for the cloud platform to configure configuration data of edge devices is provided, improving the configuration efficiency and avoiding errors possibly resulting from manual configurations.

In the embodiments of the present invention, a technical solution for automatically configuring edge devices based on a protocol adapter and PLC data is provided. This technical solution requires no manual configuration operations by professionals, saves manpower in configuring edge devices, and improves the efficiency and accuracy of the configurations of edge devices.

According to the embodiments of the present invention, a system for configuring edge devices is provided. FIG. 1 is a block diagram for the system for configuring edge devices according to the embodiments of the present invention. As shown in FIG. 1, the system for configuring edge devices comprises one or more edge devices 1 generating corresponding one or more field data, a controller 2 connected to one or more edge devices 1 to acquire one or more field data, and a cloud platform 3 connected to the controller 2 to configure one or more edge devices 1, wherein the cloud platform 3 comprises a cloud platform receiving module 31 receiving one or more field data from the controller 2, an asset database 32, the asset database 32 comprising one or more templates corresponding to the configuration data of one or more edge devices 1, and a configuration module 33, the configuration module 33 configuring one or more edge devices 1 according to one or more field data and the corresponding templates.

An edge device 1 can be any device connected to a PLC and required to be configured, for example, an electric motor, Profinet device, or a radio frequency identification (RFID) device. These edge devices 1 generate a lot of corresponding field data and the controller 2 can acquire field data. The controller 2 is a PLC, or comprises a PLC, or is connected to a PLC to acquire field data. The controller 2 transmits the acquired field data to the cloud platform 3. The cloud platform 3 is connected to the controller 2, that is to say, the cloud platform 3 is directly connected to a PLC, or connected to a PLC through the controller 2. The cloud platform 3, for example, a MindSphere data analysis platform, comprises a cloud platform receiving module 31 which can acquire one or more transmitted field data from the controller 2. The cloud platform 3 further comprises the asset database 32, the asset database 32 contains the information of different edge devices 1, and the parameters of different edge devices 1 can be provided in the form of templates. The configuration module 33 can automatically configure edge devices 1 in combination with the corresponding templates of different edge devices 1 and the corresponding field data on the cloud platform. For example, an application for acquiring field data can be developed on the cloud platform 3 to obtain the data for configuring edge devices.

In this way, edge devices are automatically configured according to the field data transmitted by the PLC and the preset templates on the cloud platform, improving the configuration efficiency and avoiding errors possibly resulting from manual configurations.

Figure 2:
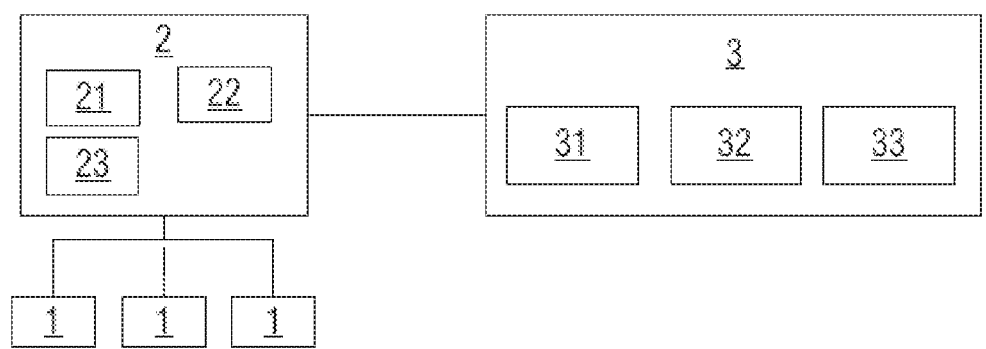
FIG. 2 is a block diagram for the system for configuring edge devices according to one example embodiment of the present invention.

FIG. 2 is a block diagram for the system for configuring edge devices according to one example embodiment of the present invention. As shown in FIG. 2, the controller 2 comprises a receiver 21 acquiring one or more field data from one or more edge devices 1, a data packetization module 22 packetizing the acquired one or more field data into a data packet according to a preset protocol, and a transmitter 23 transmitting the data packet to the cloud platform receiving module 31 of the cloud platform 3.

The receiver 21 can be any type of receiver and the controller 2 acquires field data from one or more edge devices 1 through the receiver 21. The received field data needs to be packetized before being transmitted by the transmitter 23 to the cloud platform receiving module 31 of the cloud platform 3, and the transmitter 23 can be any transmitter which can transmit data packets. Data is packetized by the data packetization module 22 according to a preset protocol. To correctly analyze a data packet on the cloud platform 3, the preset protocols for packetizing data can be set according to the information of different edge devices, and the controller 2 and the cloud platform 3 both contain these preset protocols so that data packets can be analyzed into correct specific data on the cloud platform 3.

In this way, data packets of field data are transmitted to the cloud platform based on preset protocols.

Figure 3:
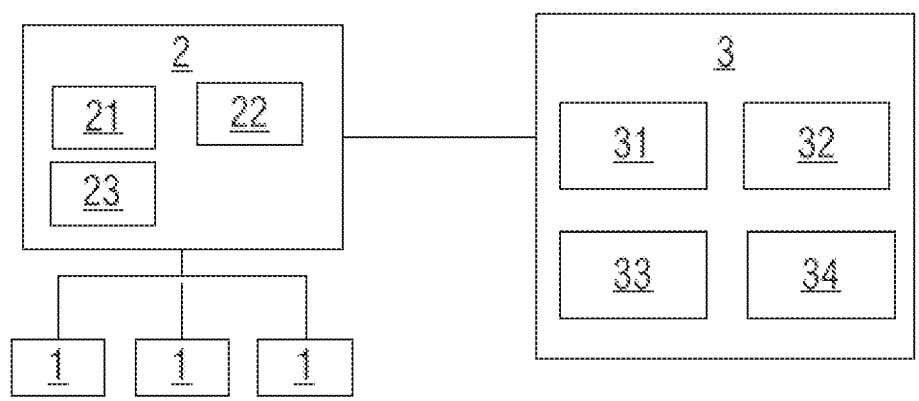
FIG. 3 is a block diagram for the system for configuring edge devices according to another example embodiment of the present invention.

FIG. 3 is a block diagram for the system for configuring edge devices according to another example embodiment of the present invention. As shown in FIG. 3, the cloud platform 3 further comprises a protocol adapter 34 acquiring a data packet from the cloud platform receiving module 31 and determining the corresponding protocol according to the data packet.

The protocol adapter 34 can be, for example, a module developed on the cloud platform 3 to determine the protocol for packetizing data. The protocol adapter 34 can be integrated into the cloud platform 3. A data packet is transmitted from the cloud platform receiving module 31 to the protocol adapter 34, the protocol adapter 34 determines the protocol for packetizing data according to the preset method, and the protocol is used for the subsequent data packet analysis.

In this way, the protocol for packetizing field data is determined.

Figure 4:
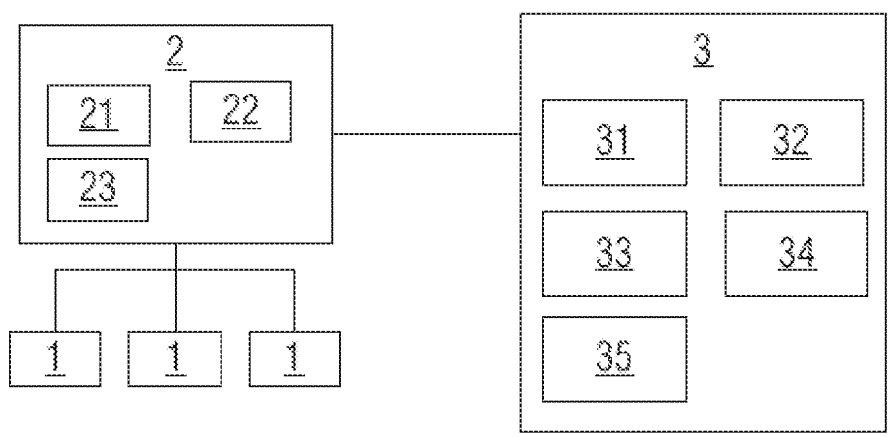
FIG. 4 is a block diagram for the system for configuring edge devices according to a further example embodiment of the present invention.

FIG. 4 is a block diagram for the system for configuring edge devices according to a further example embodiment of the present invention. As shown in FIG. 4, the cloud platform 3 further comprises a protocol library 35, one or more protocols for packetizing field data are stored in the protocol library 35, and the protocol adapter 34 analyzes at least a part of the data packet to acquire analysis data and searches the protocol library 35 according to the analysis data to determine the corresponding protocol.

A data packet is packetized according to a preset protocol and a part of the data packet can be used to identify the protocol for packetization. For example, the packet header part of the data packet can be used to identify the protocol for packetization. The protocol adapter 34 identifies the data representing the protocol by analyzing the data of the packet header part, matches it against the protocols stored in the protocol library 35, and determines the corresponding protocol in the protocol library 35, namely, the protocol for packetization, according to the correct match. Whereby, the protocol adapter 34 identifies the protocol for packetizing field data through cooperation with the protocol library 35.

In this way, the protocol is determined according to the match between the protocols stored in the protocol library and the data packet on the cloud platform.

Figure 5:
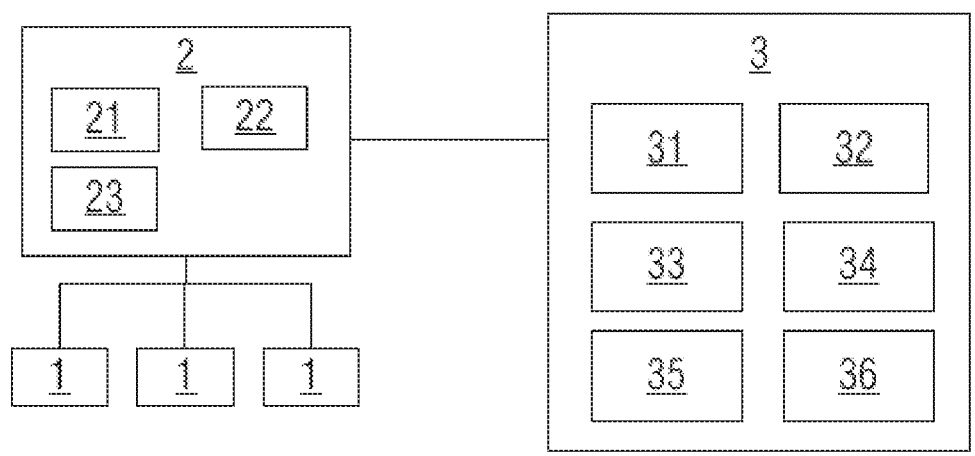
FIG. 5 is a block diagram for the system for configuring edge devices according to a fourth example embodiment of the present invention.

FIG. 5 is a block diagram for the system for configuring edge devices according to a fourth example embodiment of the present invention. As shown in FIG. 5, the cloud platform 3 further comprises one or more data analysis modules 36, each data analysis module 36 corresponds to one edge device 1 of one or more edge devices, receives the corresponding data packet of the edge device 1, and analyzes the data packet according to the corresponding protocol to acquire the specific values of field data, and the protocol adapter 34 transmits the data packet to the corresponding data analysis module 36 after determining the corresponding protocol.

To analyze specific field data, a data analysis module 36 corresponding to each type of field data or edge device is set on the cloud platform 3. For example, the motor data analysis module can analyze field data of an electric motor. After determining the corresponding protocol for packetizing field data, the protocol adapter 34 can determine the corresponding edge device of the data packet of the field data, thus transmitting the data packet to the corresponding data analysis module 36. For example, for an edge device which is an electric motor, the data packet of the field data of the electric motor is transmitted to the motor data analysis module so that the motor data analysis module can analyze the data packet of the field data of the electric motor to obtain the specific values of the field data of the electric motor before packetization. The field data of an electric motor, for example, includes location, serial number, revolutions per minute, temperature, power, direction, and run or stop.

In this way, a specific analysis module is used to analyze the specific values of field data of the corresponding edge device.

According to one example embodiment, each template in the asset database 32 is configured according to the information of different edge devices 1, and one or more data analysis modules 36 generate configuration data according to the specific values and the templates in the asset database 32, and the configuration data is transmitted to the configuration module 33 to configure one or more edge devices 1.

Since the data used to run and configure each type of edge device is different, for different edge devices 1, for example, an electric motor and an RFID device, the corresponding templates in the asset database 32 are configured according to the information of the electric motor and the RFID device, respectively. The specific value of the corresponding field data of each type of parameter is defined in the template, and the configuration module 33 can automatically configure each parameter or attribute of an edge device 1 according to the correspondence between the acquired specific value and the template in the asset database 32.

In this way, edge devices are configured according to the templates and the specific values of field data.

According to one example embodiment, each template comprises a subfunction module, the subfunction module defines the information for configuring the corresponding edge device, and configuration data is generated based on the information, wherein the information indicates the correspondences between the specific values and the parameters of the edge device.

The subfunction module, for example, is a specific configuration table adopted for each type of template, and the specific configuration table defines the information for configuring the corresponding edge device, for example, parameters, parameter types, addresses, and initial values, and can also contain other information used for configuring the edge device. The configuration module 33 correlates the specific values of field data with the corresponding locations of the table to configure edge devices.

In this way, the templates for field data are set.

Figure 6:
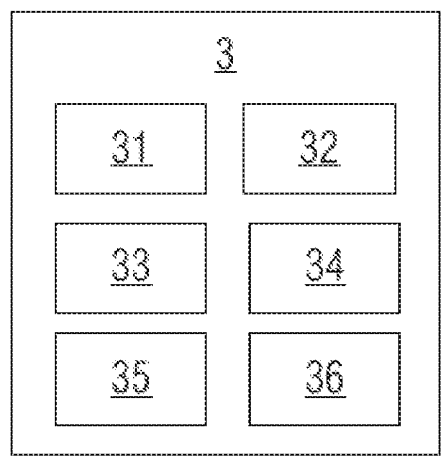
FIG. 6 is a block diagram for the cloud platform for configuring edge devices according to the embodiments of the present invention.

According to another aspect of the embodiments of the present invention, a cloud platform for configuring edge devices is provided. FIG. 6 is a block diagram for the cloud platform for configuring edge devices. As shown in FIG. 6, the cloud platform 3 comprises a cloud platform receiving module 31 configured to receive one or more field data, one or more field data being generated by the corresponding one or more edge devices, an asset database 32, the asset database 32 comprising one or more templates corresponding to the configuration data of one or more edge devices, and a configuration module 33, the configuration module configuring one or more edge devices according to one or more field data and the corresponding templates.

As shown in FIG. 6, according to one example embodiment, one or more field data received by the cloud platform receiving module 31 is a data packet packetized according to a preset protocol, and the cloud platform 3 further comprises a protocol adapter 34 acquiring the data packet from the cloud platform receiving module 31 and determining the corresponding protocol according to the data packet.

As shown in FIG. 6, according to one example embodiment, the cloud platform 3 further comprises a protocol library 35, one or more protocols for packetizing field data are stored in the protocol library 35, and the protocol adapter 34 analyzes at least a part of the data packet to acquire analysis data and searches the protocol library 35 according to the analysis data to determine the corresponding protocol.

As shown in FIG. 6, according to one example embodiment, the cloud platform 3 further comprises one or more data analysis modules 36, each data analysis module 36 corresponds to one edge device of one or more edge devices, it receives the corresponding data packet of the edge device, and analyzes the data packet according to the corresponding protocol to acquire the specific values of field data, and the protocol adapter 34 transmits the data packet to the corresponding data analysis module 36 after determining the corresponding protocol.

As shown in FIG. 6, according to one example embodiment, each template in the asset database 32 is configured according to the information of different edge devices, one or more data analysis modules 36 generate configuration data according to the specific values and the templates in the asset database 32, and the configuration data is transmitted to the configuration module to configure one or more edge devices.

As shown in FIG. 6, according to one example embodiment, each template comprises a subfunction module, the subfunction module defines the information for configuring the corresponding edge device, and configuration data is generated based on the information, wherein the information indicates the correspondences between the specific values and the parameters of the edge device.

The cloud platform used in the above-mentioned system for configuring edge devices is set as above. For the processing executed by the cloud platform, please refer to the above and its detailed description is omitted here.

Figure 7:
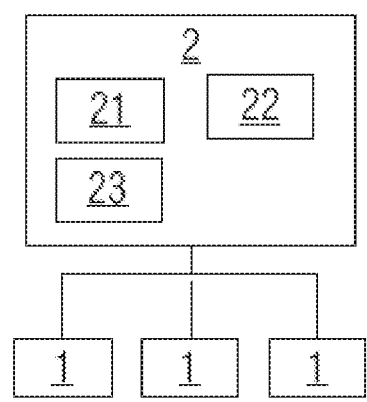
FIG. 7 is a block diagram for the device for configuring edge devices according to the embodiments of the present invention.

According to a further aspect of the embodiments of the present invention, a device for configuring edge devices is provided. FIG. 7 is a block diagram for the device for configuring edge devices according to the embodiments of the present invention. As shown in FIG. 7, the device comprises a controller 2 connected to one or more edge devices 1 to acquire one or more field data, one or more field data is generated by the corresponding one or more edge devices 1, and the controller 2 comprises a receiver 21 acquiring one or more field data from one or more edge devices 1, a data packetization module 22 packetizing the acquired one or more field data into a data packet according to a preset protocol, and a transmitter 23 transmitting the data packet to the cloud platform receiving module of the cloud platform. The data packet is used by the cloud platform to generate configuration data of one or more edge devices according to the corresponding one or more templates of the configuration data of one or more edge devices.

The device used in the above-mentioned system for configuring edge devices is set as above. For the processing executed by the device, please refer to the above and its detailed description is omitted here.

In this way, edge devices are automatically configured according to the field data and the preset templates, improving the configuration efficiency and avoiding errors possibly resulting from manual configurations.

Figure 8:
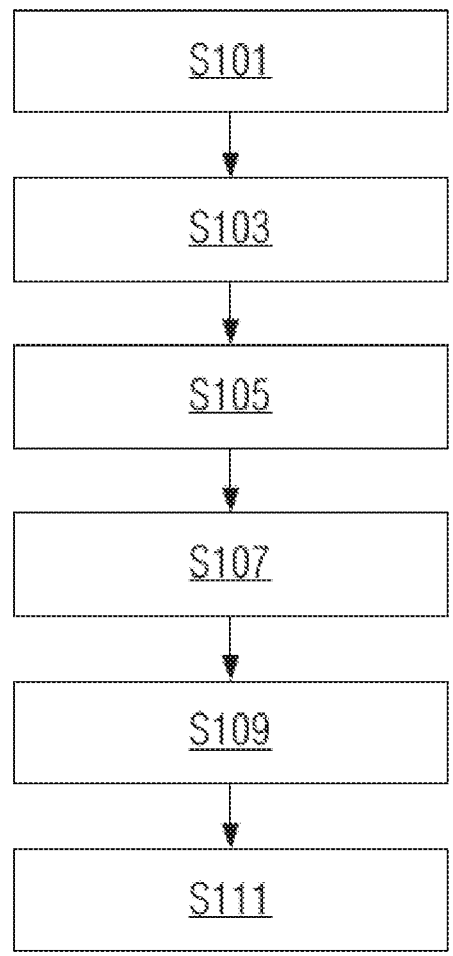
FIG. 8 is a flowchart of the method for configuring edge devices according to the embodiments of the present invention.

According to a fourth aspect of the embodiments of the present invention, a method for configuring edge devices is provided. FIG. 8 is a flowchart of the method for configuring edge devices according to the embodiments of the present invention. As shown in FIG. 8, the method comprises S101 of receiving one or more field data, wherein one or more field data is generated by the corresponding one or more field devices, and S103 of configuring one or more edge devices according to one or more field data and the corresponding one or more templates, wherein one or more templates are included in the asset database.

The method is carried out on the cloud platform to automatically configure edge devices according to the field data and the preset templates, improving the configuration efficiency and avoiding errors possibly resulting from manual configurations.

Then, the method further comprises S105 of analyzing at least a part of the data packet to acquire analysis data and searching the protocol library according to the analysis data to determine the corresponding protocol, wherein one or more protocols for packetizing field data are stored in the protocol library.

According to one example embodiment, the received one or more field data is a data packet packetized according to a preset protocol, and the method further comprises S107 of determining the corresponding protocol according to the data packet.

In this way, the protocol is determined according to the match between the protocols stored in the protocol library and the data packet.

According to one example embodiment, the method further comprises S109 of analyzing the data packet according to the corresponding protocol to acquire the specific values of field data.

In this way, the specific values of the corresponding edge devices are analyzed.

According to one example embodiment, each template is configured according to the information of different edge devices and the method further comprises S111 of generating configuration data according to the specific values and the templates.

In this way, edge devices are configured according to the templates and the specific values of field data.

According to one example embodiment, each template comprises a subfunction module, the subfunction module defines the information for configuring the corresponding edge device, and configuration data is generated based on the information, wherein the information indicates the correspondences between the specific values and the parameters of the edge device.

In this way, the templates for field data are set.

The processing of the above-mentioned method is carried out on the cloud platform. For details, please refer to the above and the detailed description is omitted here.

Figure 9:
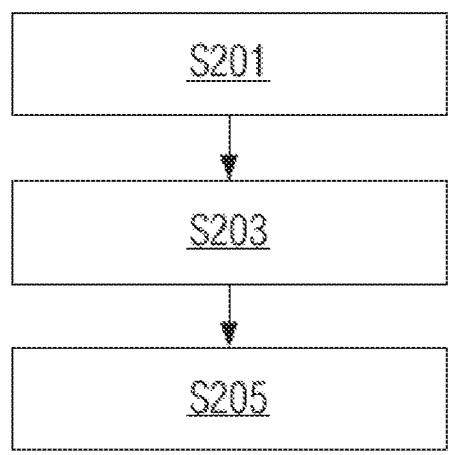
FIG. 9 is a flowchart of the method for generating configuration data of edge devices according to the embodiments of the present invention.

According to a fifth aspect of the embodiments of the present invention, a method for generating configuration data of edge devices is provided. FIG. 9 is a flowchart of the method for generating configuration data of edge devices according to the embodiments of the present invention. As shown in FIG. 9, the method comprises S201 of acquiring one or more field data from one or more edge devices, wherein one or more field data is generated by the corresponding one or more edge devices, S203 of packetizing the acquired one or more field data into a data packet according to a preset protocol, and S205 of transmitting the data packet to the cloud platform, wherein the data packet is used by the cloud platform to generate configuration data of one or more edge devices according to the corresponding one or more templates of the configuration data of one or more edge devices.

In this way, a method for the cloud platform to configure configuration data of edge devices is provided, improving the configuration efficiency and avoiding errors possibly resulting from manual configurations.

The processing of the above-mentioned method is carried out on the PLC. For details, please refer to the above and the detailed description is omitted here.

The present invention further provides example embodiments to help you understand the solution for configuring edge devices in the present invention.

Embodiment 1: Configure RFID Devices

The PLC is connected to each RFID device and RFID devices generate a lot of field data during running. A developed application, for example, the MindConnet function module, is set in the PLC and can collect the data model and data values of RFID devices. A data protocol can be designed through the application, and the data protocol is used to packet field data of RFID devices. A data protocol is designed based on the device information of RFID devices and a protocol library is set on the cloud platform (for example, MindSphere). The protocol library is established by integrating the data protocols of different devices, including the data protocol of RFID devices, so that a protocol adapter can be configured on the cloud platform to analyze the field data packetized according to the corresponding data protocol. For example, the data protocol of RFID devices is adopted to analyze field data generated by RFID devices.

A totally integrated automation (TIA) portal (TIA Portal) can access the device information of RFID devices. For RFID devices, the TIA portal stores their specific configuration parameters.

The asset library on the cloud platform contains the templates of RFID devices. In particular, an RFID template library of parameters, parameter types and addresses corresponding to the RFID devices in the TIA portal is set on the MindSphere cloud platform. Through the TIA portal, the templates are established by use of the subfunction module. The subfunction module defines the parameters, parameter types and addresses of RFID devices and puts the configuration parameters of different RFID devices in a table. The asset library also contains explanations on parameter values and the explanations are used to analyze the acquired field RFID data. After the specific values of the field data of RFID devices are analyzed by the RFID data analysis module, they are correlated with the corresponding locations in the table to configure RFID devices on the cloud platform so that field data of RFID devices can correctly be acquired and the field data can correctly be analyzed on the cloud platform.

Embodiment 2: Configure Profinet Devices

Similarly, the PLC is connected to each Profinet device. Profinet devices can be selected in the TIA portal. Accordingly, the library of Profinet devices is configured by use of the information such as manufacturer ID, device IDs, and device access points on MindSphere.

After Profinet devices transmit the generated field data to MindSphere and it is determined according to the protocol for packetizing data that the field data has been generated by Profinet devices, the Profinet data analysis module analyzes the field data according to the library of Profinet devices to acquire their specific values, and then finds the corresponding configurations in the library. Thus, the corresponding attributes of Profinet devices are found on MindSphere to realize automatic configuration on the cloud platform.

The asset (edge device) configuration completed by use of the system, cloud platform, device and method for configuring edge devices and the method for generating configuration data of edge devices based on the preset data protocol and the asset database or template library and the protocol adapter of the cloud platform can improve the efficiency of edge device configuration and lower the cost. In addition, according to the data protocols of different edge devices of the cloud platform, the information of edge devices can be learned and the user experience can be improved.

Among the above-described embodiments of the present invention, each embodiment has its own emphasis. For the parts not described in an embodiment, please refer to the related description in other embodiments.

It should be understood that the technical content disclosed in the embodiments of the present invention can be realized in other ways. The above-described embodiments of the device are given only for example purposes. The division of units or modules is only a logical function division, and other division methods can be used in the actual realization. For example, a plurality of units or modules or components can be combined or integrated into another system, or some characteristics can be ignored or are not executed. In addition, the shown or discussed couplings, or direct couplings or communication connections between them can be indirect couplings or communication connections, electrical or otherwise, through some interfaces, modules or units.

The unit or module described as a separate part can be or cannot be physically separated, and the part shown as a unit or module can be or cannot be a physical unit or module, that is to say, it can be located at one place or can be distributed to a plurality of network units or modules. Part or all of the units or modules can be selected to realize the solution of an embodiment according to the actual requirement.

In addition, each functional unit or module in the various embodiments of the present invention may be integrated in a processing unit or module, or each unit or module may physically exist independently, or two or more units or modules may be integrated into one unit or module. The integrated unit or module described above may not only be implemented in the form of hardware, but may also be implemented in the form of a software functional unit.

The integrated unit can be stored in a computer-accessible storage medium if it is implemented in the form of a software functional unit and is marketed or used as an independent product. Based on such an understanding, the technical solution of the present invention or the part which makes contributions to the prior art, or all or part of the technical solution can essentially be represented in the form of a software product, and the computer software product is stored in a storage medium and comprises a plurality of instructions to enable a computer (PC, server or network equipment) to execute all or part of the steps of the method described in the embodiments of the present invention. The previously-mentioned storage media include USB disk, read-only memory (ROM), random access memory (RAM), mobile hard disk, magnetic disk or compact disk and other various media which can store program codes.

Only preferred embodiments of the present invention are described above. It should be pointed out that those skilled in the art can make improvements and modifications without departing from the principle of the present invention and these improvements and modifications should also fall within the scope of protection of the present invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A system for configuring edge devices, comprising:
one or more edge devices generating corresponding one or more field data,
a controller connected to the one or more edge devices to acquire the one or more field data, and
a cloud platform connected to the controller to configure the one or more edge devices, the cloud platform including
a cloud platform receiving module to receive the one or more field data from the controller,
an asset database, the asset database including one or more templates respectively corresponding to configuration data of the one or more edge devices, and
a configuration module to configure a respective one or more of the edge devices according to a respective one or more of the field data and the one or more templates respectively corresponding to configuration data of the one or more edge devices.

2. The system of claim 1, wherein the controller includes:
a receiver, to acquire the one or more field data from the one or more edge devices,
a data packetization module to packetize the one or more field data into a data packet according to a protocol, and
a transmitter to transmit the data packet to the cloud platform receiving module of the cloud platform.

3. The system of claim 2, wherein the cloud platform further includes:
a protocol adapter to acquire the data packet from the cloud platform receiving module and to determine the protocol according to the data packet.

4. The system of claim 3, wherein the cloud platform further includes:
a protocol library, one or more protocols for packetizing the one or more field data being stored in the protocol library, and wherein the protocol adapter is configured to analyze at least a part of the data packet to acquire analysis data and configured to search the protocol library according to the analysis data to determine the protocol.

5. The system of claim 3, wherein the cloud platform further includes:
one or more data analysis modules, each data analysis module, of the one or more data analysis modules, respectively corresponding to one edge device of the one or more edge devices, being configured to receive a corresponding data packet of the corresponding one edge device, and being configured to analyze the corresponding data packet according to a corresponding protocol, to acquire specific values of a respective one of the one or more field data, and
wherein the protocol adapter is configured to transmit the data packet to a corresponding the data analysis module after determining the corresponding protocol.

6. The system of claim 5, wherein each template in the asset database is configured according to information of different edge devices of the one or more edge devices, and the one or more data analysis modules being configured to generate configuration data according to the specific values and the templates in the asset database, and wherein the configuration data is sent to the configuration module to configure the one or more edge devices.

7. The system of claim 6, wherein each template comprises a subfunction module, the subfunction module defining the information for configuring the corresponding edge device, and the configuration data being generated based on the information, wherein the information indicates the correspondences between the specific values and the parameters of the corresponding edge device.

8. A cloud platform for configuring one or more edge devices, the cloud platform being connected to a controller and the controller being connected to the one or more edge devices, the cloud platform comprising:
   a cloud platform receiving module to receive one or more field data from the controller, the one or more field data being generated by respectively corresponding one or more edge devices of the one or more edge devices,
   an asset database, the asset database including one or more templates respectively corresponding to configuration data of one or more the edge devices, and
   a configuration module, to configure a respective one or more of the edge devices according to a respective one or more of the field data received from the controller and the one or more templates respectively corresponding to configuration data of the one or more edge devices.

9. The cloud platform of claim 8, wherein the one or more field data received by the cloud platform receiving module are a data packet packetized according to a protocol, and wherein the cloud platform further comprises:
   a protocol adapter to acquire the data packet from the cloud platform receiving module and to determine the protocol according to the data packet.

10. The cloud platform of claim 9, further comprising:
   a protocol library, one or more protocols for packetizing the one or more field data being stored in the protocol library, and
   the protocol adapter being configured to analyze at least a part of the data packet to acquire analysis data and being configured to search the protocol library according to the analysis data to determine the protocol.

11. The cloud platform of claim 9, further comprising:
   one or more data analysis modules, each data analysis module, of the one or more data analysis modules, respectively corresponding to one edge device of the one or more edge devices, being configured to receive a corresponding data packet of the corresponding one edge device, and being configured to analyze the corresponding data packet according to a corresponding protocol, to acquire specific values of a respective one of the one or more field data, and
   wherein the protocol adapter is configured to transmit the data packet to a corresponding the data analysis module after determining the corresponding protocol.

12. The cloud platform of claim 11, wherein each template in the asset database is configured according to information of different edge devices of the one or more edge devices, and
   the one or more data analysis modules being configured to generate configuration data according to the specific values and the templates in the asset database, and wherein the configuration data is sent to the configuration module to configure the one or more edge devices.

13. The cloud platform of claim 12, wherein each template comprises a subfunction module, the subfunction module defining the information for configuring the corresponding edge device, and the configuration data being generated based on the information, wherein the information indicates the correspondences between the specific values and the parameters of the corresponding edge device.

14. A method for configuring one or more edge devices, the one or more edge devices being connected to a controller, and the controller being connected to a cloud platform, the method comprising:
   receiving one or more field data from the controller, wherein the one or more field data is generated by a corresponding one or more of the edge devices; and
   configuring a respective one or more of the edge devices according to a respective one or more of the field data received from the controller and one or more templates respectively corresponding to configuration data of the one or more edge devices, wherein the one or more templates are included in an asset database.

15. The method of claim 14, wherein the one or more field data received are a data packet packetized according to a protocol, and wherein the method further comprises:
   determining the protocol according to the data packet.

16. The method of claim 15, further comprising:
   analyzing at least a part of the data packet to acquire analysis data and searching the protocol library according to the analysis data to determine the protocol, wherein one or more protocols for packetizing field data are stored in the protocol library.

17. The method of claim 15, the method further comprising:
   analyzing the data packet according to the protocol to acquire the specific values of the one or more field data.

18. The method of claim 17, wherein each different template, of the one or more templates, is respectively configured according to information of different edge devices of the one or more edge devices, and wherein the method further comprises:
   generating configuration data according to the specific values and the one or more templates.

19. The method of claim 18, wherein each template comprises a subfunction module, the subfunction module defining information for configuring a corresponding edge device, wherein the configuration data is generated based on the information, and wherein the information indicates correspondences between the specific values and the parameters of the corresponding edge device.

* * * * *